(12) United States Patent
Prashant et al.

(10) Patent No.: US 9,092,617 B2
(45) Date of Patent: Jul. 28, 2015

(54) PROTECTING SYSTEMS FROM UNAUTHORIZED ACCESS TO SYSTEM RESOURCES USING BROWSER INDEPENDENT WEB PAGE TECHNOLOGY

(71) Applicant: Intel Corporation, Santa Clara, CA (US)

(72) Inventors: Dewan Prashant, Hillsboro, OR (US); Hong Li, El Dorado Hills, CA (US); David M. Durham, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/671,690

(22) Filed: Nov. 8, 2012

(65) Prior Publication Data
US 2014/0130187 A1    May 8, 2014

(51) Int. Cl.
*G06F 21/53* (2013.01)

(52) U.S. Cl.
CPC ...................................... *G06F 21/53* (2013.01)

(58) Field of Classification Search
CPC ... H04L 63/0263; H04L 12/585; H04L 51/12; H04L 63/14; H04L 67/02; G06F 2221/2149; G06F 21/53
USPC ...................................................... 726/22–25
See application file for complete search history.

(56) References Cited

U.S. PATENT DOCUMENTS

| 8,478,798 | B2 | 7/2013 | Uhrhane | |
|---|---|---|---|---|
| 2007/0136579 | A1* | 6/2007 | Levy et al. | 713/168 |
| 2007/0261124 | A1* | 11/2007 | Centonze et al. | 726/27 |
| 2008/0244576 | A1* | 10/2008 | Kwon et al. | 718/1 |
| 2008/0313648 | A1* | 12/2008 | Wang et al. | 719/315 |
| 2010/0228989 | A1 | 9/2010 | Neystadt | |
| 2010/0235820 | A1* | 9/2010 | Khouzam et al. | 717/148 |
| 2011/0058549 | A1* | 3/2011 | Harel et al. | 370/390 |
| 2012/0254999 | A1* | 10/2012 | Sallam | 726/23 |
| 2013/0198325 | A1* | 8/2013 | Bourges-Sevenier | 709/217 |
| 2013/0227521 | A1* | 8/2013 | Bourd et al. | 717/110 |

FOREIGN PATENT DOCUMENTS

| EP | 1209551 | 5/2002 |
|---|---|---|
| KR | 10-0373811 | 2/2003 |
| WO | 02-03208 | 1/2002 |

OTHER PUBLICATIONS

PCT International Search Report and Written Opinion issued in corresponding PCT/US2013/066346 dated Feb. 7, 2014, (9 pages).

* cited by examiner

*Primary Examiner* — Andrew Nalven
*Assistant Examiner* — Mary Li
(74) *Attorney, Agent, or Firm* — Trop, Pruner & Hu, P.C.

(57) ABSTRACT

In some embodiments, a filter may filter web graphics library code executing on the graphics processing unit. As a result the web graphics library code may be prevented from accessing memory or other resources that are not allocated specifically for the web graphics library module. Likewise web graphics library code may not access any shared resources that have been explicitly assigned to the process specific web graphics library module.

25 Claims, 2 Drawing Sheets

PROTECTING SYSTEMS FROM UNAUTHORIZED ACCESS TO SYSTEM RESOURCES USING BROWSER INDEPENDENT WEB PAGE TECHNOLOGY

BACKGROUND

This relates to technologies that allow a web page to execute native code without control by a browser including, a web graphics library (WebGL) or web computing language (WebCL) herein termed "browser independent web page technology."

A WebGL is used for user interface rendering, compute offloading and other tasks from the confines of the Hypertext MarkUp Language version 5 (HTML 5) file environment. An application can use the web graphics library to execute native code on a platform, outside the purview of the web browser. As a result, applications may be able to render high quality user interfaces and enhance user experience. This is commonly done to utilize the compute capacity of the platform for rendering pleasing user interfaces and faster computing.

A web graphics library is a graphics script application program interface (API) for rendering three-dimensional graphics and two-dimensional graphics within any compatible web browser with the use of plug-ins. It is integrated completed into a compatible web browser allowing graphics processing unit accelerated usage of physics and image processing and effects as part of the web page canvas. A web application or web page using WebGL/WebCL uses of control codes written in JavaScript to offload programmed modules to the device in general and the processor graphics in particular.

Web computing (WebCL) language is a JavaScript binding to an OpenCL for heterogeneous parallel computing within any compatible web browser without the use of plug-ins. WebCL allows web applications to actualize speed with multicore central processing units and graphics processing units. This may make computationally intensive programs feasible in the browser for physics engines and video editing.

BRIEF DESCRIPTION OF THE DRAWINGS

Some embodiments are described with respect to the following figures.

DETAILED DESCRIPTION

The web graphics library and the web computing language can run outside the control of browser on the graphics processing unit and they have unhindered access to system memory. As a result, they can interfere with other workloads running on the graphics processor as well as processes or subcomponents of a processor running on the central processing unit. This problem arises from the fact that HTML5 provides a conduit via the web graphics library and web computing language (WebCL) for executing native code downloaded from the web.

Web graphics library code goes through multiple levels of translations and recompilations before it executes on a graphics processing unit. These translations are outside the scope of the browser's control and are platform-dependent. As a result, malicious script can use a translation engine or an operating system run time to attack the platform.

In some embodiments, a filter may filter code for a browser independent web page technology code executing on the graphics processing unit. As a result the code may be prevented from accessing memory or other resources that are not allocated specifically for the module. Likewise the code may not access any shared resources that have not been explicitly assigned to the process specific code.

This approach differs from traditional sandboxing used on central processing units, since processes on a central processing unit frequently share code and data through shared memory. In contrast workloads on the graphics processing unit are largely self-contained, making sandboxing more viable. This approach is applicable to any browser independent web page technology, including WebGL and WebCL.

Figure 1:
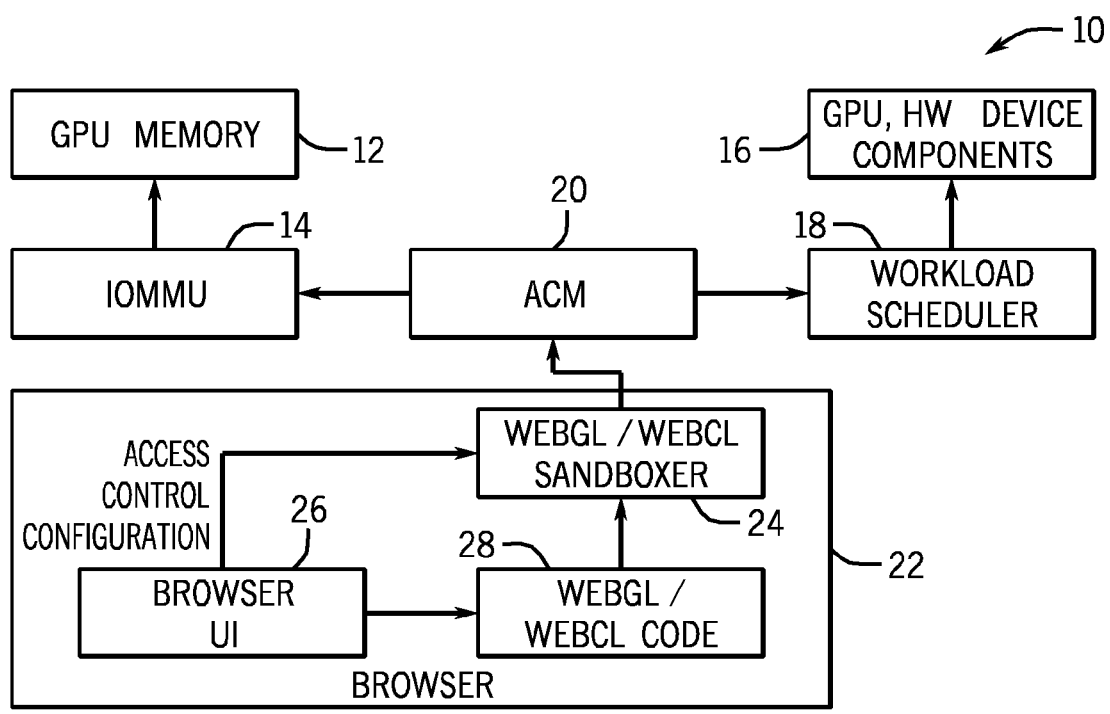
FIG. 1 is a system depiction for one embodiment of the present invention.

Referring to FIG. 1, a web browser 22 on a platform 10 may include a web graphics library/web computing language sandboxer 24. It receives inputs from the browser user interface 26 including an access control configuration and an input from the web graphics library/web computing language code 28. Thus these inputs may be reviewed to determine which inputs are appropriate for the given module. To this end, the sandboxer 24 provides an output to an access control module (ACM) 20. It decides which operations are legitimate and sends only legitimate operations to the workload scheduler 18 and on to the graphics processing unit and other hardware devices 16, as well as to the Input/Output Memory Management Unit (IOMMU) 14 in the graphics processing memory 12.

Figure 2:
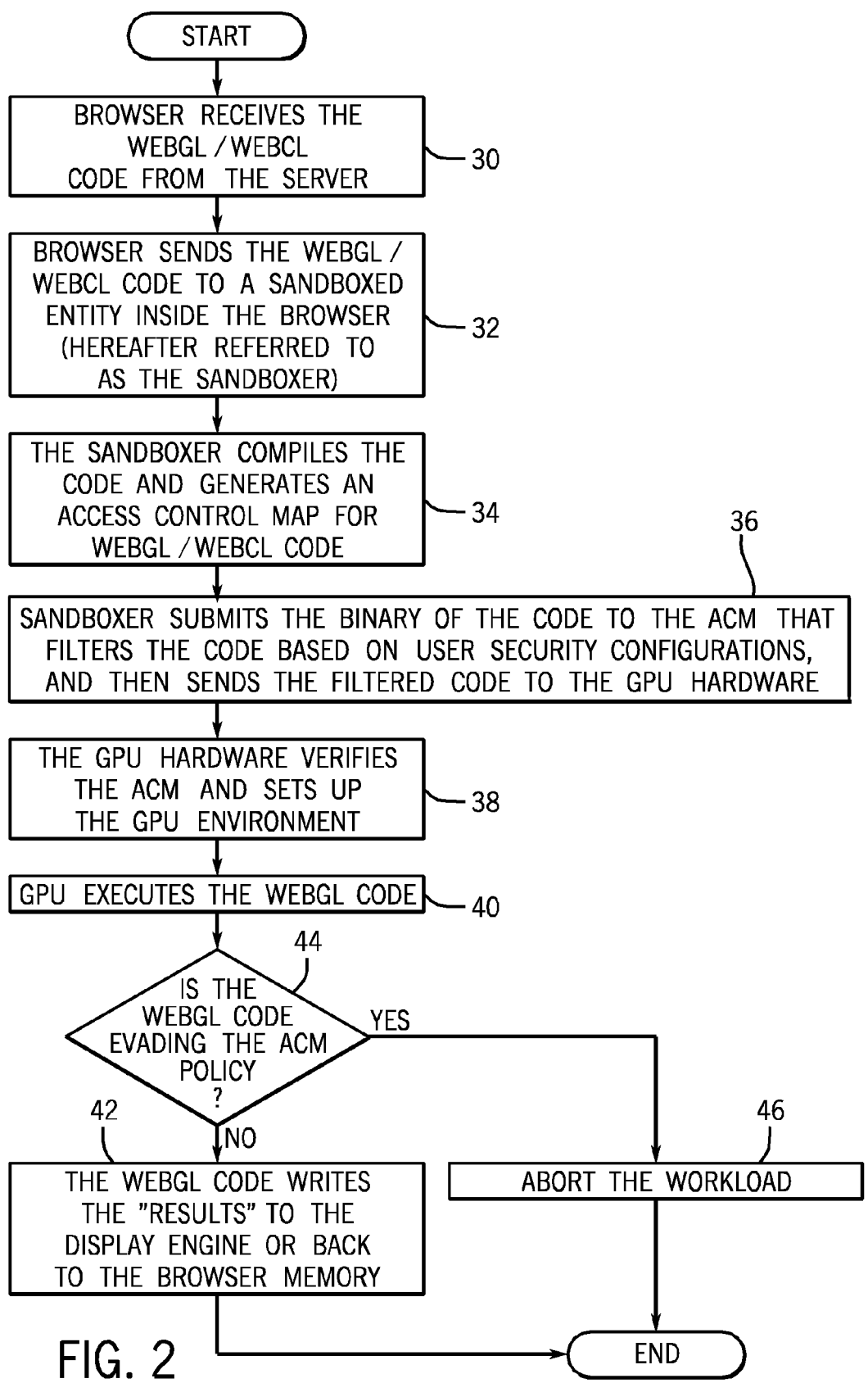
FIG. 2 is a flow chart for a sequence according to one embodiment of the present invention.

The implementation of the access control module 20, shown in FIG. 2, may be done in software, firmware and/or hardware. In software and firmware embodiments it may be implemented by computer executed instructions stored in one or more non-transitory computer readable media, such as a magnetic, optical or semiconductor storage.

The sequence shown in FIG. 2 begins by receiving the open graphics library or open computing library code from a server as indicated at 30. The browser sends the web graphics library or web computing library code to the sandbox entity inside the browser such as the sandboxer 24, as indicated in block 32. Then the sandboxer compiles the code and generates an access control map for the web graphics library/web computing language code as indicated in block 34.

The access control map is then utilized by the access control module 20 to control access rights of the web graphics library/web computing language code. It may also provide protection to the browser independent web page technology module from other code running on the same platform.

The sandboxer submits the binary of the code to the ACM that filters the code based on user security configurations and sends the filtered code to the graphics processing unit hardware via the workload scheduler 18 as shown in FIG. 1 and as indicated in block 36. The graphics processing unit hardware verifies with the ACM and sets up a graphics processing unit environment as indicated in block 38. Then the graphics processing unit executes the web graphics library code at 40. The web graphics library code writes the results to the display engine or back to the browser memory as indicated in block 42. A check at diamond 44 determines whether the web graphics library code is evading the ACM policy. If not, the code is written as required and otherwise the workload is aborted as indicated in block 46, and then the flow ends.

The sandboxer allocates requests and resources for the execution of this module on the graphics processing unit. Also the sandboxer specifies an access control map of the module that includes both hardware resources, memory resources and the time that the module is expected to run on a graphics processor in order to prevent any denial of service attacks. Then the ACM is communicated from the sandboxer to the graphics processing unit resource manager that enforces the access control for the web graphics library code. Then, the ACM provides restrictions that prevent the browser independent web page technology code from malicious tampering with other code or data on the same platform.

When the web graphics library module attempts to access locations outside its constraints or to access any resource that has been denied in the access control map, the graphics processing unit hardware may abort the whole workload and sends an error message to the browser.

Inside the hardware, different entities may work in tandem to enforce this access control. For example, input/out (I/O) memory management unit (IOMMU) may restrict memory accesses, the workload scheduler may restrict accesses to various engines inside the hardware and the scheduler may enforce the amount of time the workload can execute before it decides to abort the workload. Thus all entities may abide by the rules prescribed in the access control map.

Access control can also be extended to the display engine. The display engine may enforce which area the display web graphics libraries can write to and even provide trusted web graphics library modules to compose content generated from different sources in the cloud. This may be used to assure that textural/graphical messages, the browser needs to communicate to the user, cannot be obscured by web graphics library commands to simultaneously overwrite the display. Similarly, it prevents web graphics modules from stealing frame buffers that do not belong to the web graphics module. For example, a web graphics module may observe a virtual keyboard to steal a user's password or otherwise scrape protected content from the display buffer or the display contents of other web graphics modules.

Thus in some embodiments, a hardware-enforced access control may be provided for web graphics library code against a skilled software attacker. Moreover, some embodiments provide deterministic attestable execution of code on remote platform.

An out of band channel may be provided in some embodiments to describe additional restrictions above and beyond the browser session such that third parties can provide enhanced security above and beyond what is offered natively through individual websites. In this way, a security software provider can provide a service that specifies these additional access control map controls to provide enhanced security for customers of its service that can be overlaid on commercial websites. The out-of-band channel may be used to describe additional restrictions above and beyond the browser session such that third parties can provide enhanced security above and beyond what is offered natively through individual websites.

The following clauses and/or examples pertain to further embodiments:

One example embodiment may be a method comprising preventing browser independent web page technology code from accessing a resource not specifically allocated to that code. The method may also include preventing access in a graphics processing unit. The method may also include compiling the code and generating an access control map for the code to control access rights for the code. The method may also include checking a write by said code to determine if the access rights of the code permit the write. The method may also include aborting the write if the write does not comply with the code's access policies rights. The method may also include providing protection to the code running on a device from other code running on that device. The method may also include providing restrictions that prevent the code from maliciously tampering with other code or data on the device. The method may also include exposing said protection or restriction to a programmer using a scripting language. The method may also include providing an out-of-band channel to describe restrictions beyond a browser session. The method may also include preventing code including preventing at least one of web graphics library or web computing language code from accessing a resource not specifically allocated to that code.

Another example embodiment may be one or more non-transitory computer readable media storing instructions to enable a computer to perform a sequence according to any of the methods set forth in the preceding paragraph.

Another example embodiment may be a graphics processing unit comprising a memory and a processor coupled to the memory to block browser independent web page technology from accessing resources not allocated to said technology. The unit may include said memory storing an access control map to control access rights of said code. The unit may include said processor to check a write by the code against the code's access control rights. The unit may include said processor to protect said code from other software running on said unit. The unit may also include said processor to prevent the code from maliciously tampering with other code or data on the unit. The unit may also include said technology is one of a web graphics library or a web computing language.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   sandboxing a browser independent web page technology code;
   filtering the code based on a user security configuration to limit resources accessible by said code;
   verifying the code in a graphics processing unit, wherein sandboxing includes submitting the code to an access control module that filters the code based on the user security configuration and then sends the filtered code to the graphics processing unit; and
   preventing, in the graphics processing unit, the filtered browser independent web page technology code from accessing a resource not specifically allocated to the code.

2. The method of claim 1 including preventing access in a graphics processing unit.

3. The method of claim 1 including compiling the code and generating an access control map for the code to control access rights for the code.

4. The method of claim 3 including checking a write by said code to determine if the access rights of the code permit the write.

5. The method of claim 4 including aborting the write if the write does not comply with the code's access policies rights.

6. The method of claim 1 including providing protection to the code running on a device from other code running on that device.

7. The method of claim 6 including providing restrictions that prevent the code from maliciously tampering with other code or data on the device.

8. The method of claim 7 including exposing said protection or restriction to a programmer using a scripting language.

9. The method of claim 1 including providing an out-of-band channel to describe restrictions beyond a browser session.

10. The method of claim 1 wherein preventing code including preventing at least one of web graphics library or web computing language code from accessing a resource not specifically allocated to that code.

11. One or more non-transitory computer readable media storing instructions to enable a graphics processing unit to perform a sequence comprising:
sandboxing a browser independent web page technology code;
filtering the code based on user security configuration to limit resources accessible by said code; and
verifying the code in a graphics processing unit, wherein sandboxing includes submitting the code to an access control module that filters the code based on the user security configuration and then sends the filtered code to the graphics processing unit;
preventing, in the graphics processing unit, the filtered browser independent web page technology code from accessing a resource not specifically allocated to the code while allowing the code to operate to access resources allocated to the code.

12. The media of claim 11 further storing instructions to perform a sequence including preventing access in a graphics processing unit.

13. The media of claim 11 further storing instructions to perform a sequence including compiling the code and generating an access control map for the code to control access rights for the code.

14. The media of claim 13 further storing instructions to perform a sequence including checking a write by said code to determine if the access rights of the code permit the write.

15. The media of claim 14 further storing instructions to perform a sequence including aborting the write if the write does not comply with the code's access policies rights.

16. The media of claim 11 further storing instructions to perform a sequence including providing protection to the code running on a device from other code running on that device.

17. The media of claim 16 further storing instructions to perform a sequence including providing restrictions that prevent the code from maliciously tampering with other code or data on the device.

18. The media of claim 17 further storing instructions to perform a sequence including exposing said protection or restriction to a programmer using a scripting language.

19. The method of claim 11 further storing instructions to perform a sequence including providing an out-of-band channel to describe restrictions beyond a browser session.

20. A graphics processing unit comprising:
a memory; and
a graphics processor coupled to the memory to filter browser independent web page code based on user security configuration to limit resources accessible by said code, verify the code in a graphics processor, submit the code to an access control module that filters the code based on the user security configuration and then sends the filtered code to the graphics processor and prevent the filtered browser independent web page technology code from accessing a resource not specifically allocated to the code.

21. The unit of claim 20, said memory storing an access control map to control access rights of said code.

22. The unit of claim 20, said processor to check a write by the code against the code's access control rights.

23. The unit of claim 20, said processor to protect said code from other software running on said unit.

24. The unit of claim 23 said processor to prevent the code from maliciously tampering with other code or data on the unit.

25. The unit of claim 20 wherein said technology is one of a web graphics library or a web computing language.

* * * * *